US007940658B2

(12) United States Patent
Foschiano et al.

(10) Patent No.: US 7,940,658 B2
(45) Date of Patent: May 10, 2011

(54) ERSPAN DYNAMIC SESSION NEGOTIATION (75) Inventors: Marco Foschiano, Pinerolo (IT);
Munish Mehta, Fremont, CA (US);
Kalyan Kumar Ghosh, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 12/231,635

(22) Filed: Sep. 4, 2008

(65) Prior Publication Data
US 2010/0054152 A1 Mar. 4, 2010

(51) Int. Cl.
*H04J 3/14* (2006.01)
*H04L 12/26* (2006.01)
*G06F 15/173* (2006.01)
(52) U.S. Cl. ........ 370/230; 370/235; 370/252; 370/253; 709/224
(58) Field of Classification Search ........................ None
See application file for complete search history.

(56) References Cited

U.S. PATENT DOCUMENTS

| | | | |
|---|---|---|---|
| 2005/0097387 A1* | 5/2005 | Ano et al. | 714/4 |
| 2005/0243822 A1* | 11/2005 | Jain et al. | 370/389 |
| 2006/0062209 A1* | 3/2006 | Riley | 370/352 |
| 2006/0253900 A1* | 11/2006 | Paddon et al. | 726/11 |
| 2006/0268847 A1* | 11/2006 | Halbraich et al. | 370/352 |
| 2009/0034416 A1* | 2/2009 | Baron et al. | 370/235 |
| 2009/0041011 A1* | 2/2009 | Sheppard | 370/360 |
| 2009/0100040 A1* | 4/2009 | Sheppard et al. | 707/5 |
| 2009/0171474 A1* | 7/2009 | Birze et al. | 700/3 |

* cited by examiner

*Primary Examiner* — Chi H Pham
*Assistant Examiner* — Soon-Dong D Hyun (57) ABSTRACT A method and network device to generate a remote traffic monitoring session using an automated technique to configure the source and destination devices of the monitoring system is disclosed. The method includes discovering a Layer 3 (L3) source device and an L3 destination device and automatically configuring the devices. The L3 source device passes target traffic that will be monitored via the L3 destination device in a remote traffic monitoring session. The method verifies configurations of the L3 source device and the L3 destination device, and determines remote monitoring capabilities common to the L3 source device and the L3 destination device. The method negotiates relevant parameters for the remote traffic monitoring session and establishes the remote traffic monitoring session between the L3 source device and the L3 destination device.

22 Claims, 7 Drawing Sheets

ERSPAN DYNAMIC SESSION NEGOTIATION

BACKGROUND

1. Field

The present disclosure relates generally to remote data traffic monitoring and, more particularly, to automatically establishing and maintaining an Encapsulated Remote Switched Port Analyzer (ERSPAN) remote traffic monitoring session.

2. Related Art

Data switches support a variety of data traffic monitoring features to facilitate network maintenance and security. One such feature, an Encapsulated Remote Switched Port Analyzer (ERSPAN), allows a user to remotely monitor traffic at a source device via a remote destination device across a Layer 2 (L2) or a Layer 3 (L3) routed network. A network analysis device, also called a "sniffer", can be connected to a port on the destination device to receive and analyze the monitored traffic.

The ERSPAN feature supports monitoring traffic ingress and/or egress to one or more source ports of a source device or one or more Virtual Local Area Networks (VLANs). The monitored traffic is mirrored at the source device, encapsulated within an L3 routable Generic Routing Encapsulation (GRE) tunnel, and forwarded to the destination device. At the destination device, the mirrored traffic is switched to the appropriate destination port for analysis by the network analyzer connected to the destination port.

ERSPAN currently requires a user to manually configure the source and destination devices to establish an ERSPAN session. In some instances, source and destination devices supporting ERSPAN features may have different hardware and/or software platforms, and may support different and sometimes incompatible versions of ERSPAN. As a result, it may become burdensome for a user to properly configure the source and destination devices. Additionally, it may be complex for the user to determine an optimal configuration for an ERSPAN session based on the network topology, and the user may not be aware of connectivity issues between the source and destination device that would impact the ERSPAN session. Furthermore, it is important to ensure that ERSPAN traffic replication is not used for a Denial of Service (DoS) attack by pointing the ERSPAN tunnel to the attacked IP address.

Accordingly, there is a need in the art for automatically configuring and establishing ERSPAN sessions.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DESCRIPTION OF EXAMPLE EMBODIMENTS

Overview

A method and network device to generate a remote traffic monitoring session using an automated technique to configure the source and destination devices of the monitoring system is disclosed. The method includes discovering an L3 source device and an L3 destination device and automatically configuring the devices. The L3 source device passes target traffic that will be monitored via the L3 destination device in a remote traffic monitoring session. The method verifies configurations of the L3 source device and the L3 destination device, and determines remote monitoring capabilities common to the L3 source device and the L3 destination device. The method negotiates relevant parameters for the remote traffic monitoring session and establishes the remote traffic monitoring session between the L3 source device and the L3 destination device.

The network device includes a remote monitoring hardware engine and a session setup module. The session setup module automatically establishes a remote traffic monitoring session between an L3 source device and an L3 destination device, where the L3 source device passes target traffic that will be monitored via the L3 destination device in the remote traffic monitoring session.

DETAILED DESCRIPTION

Figure 1:
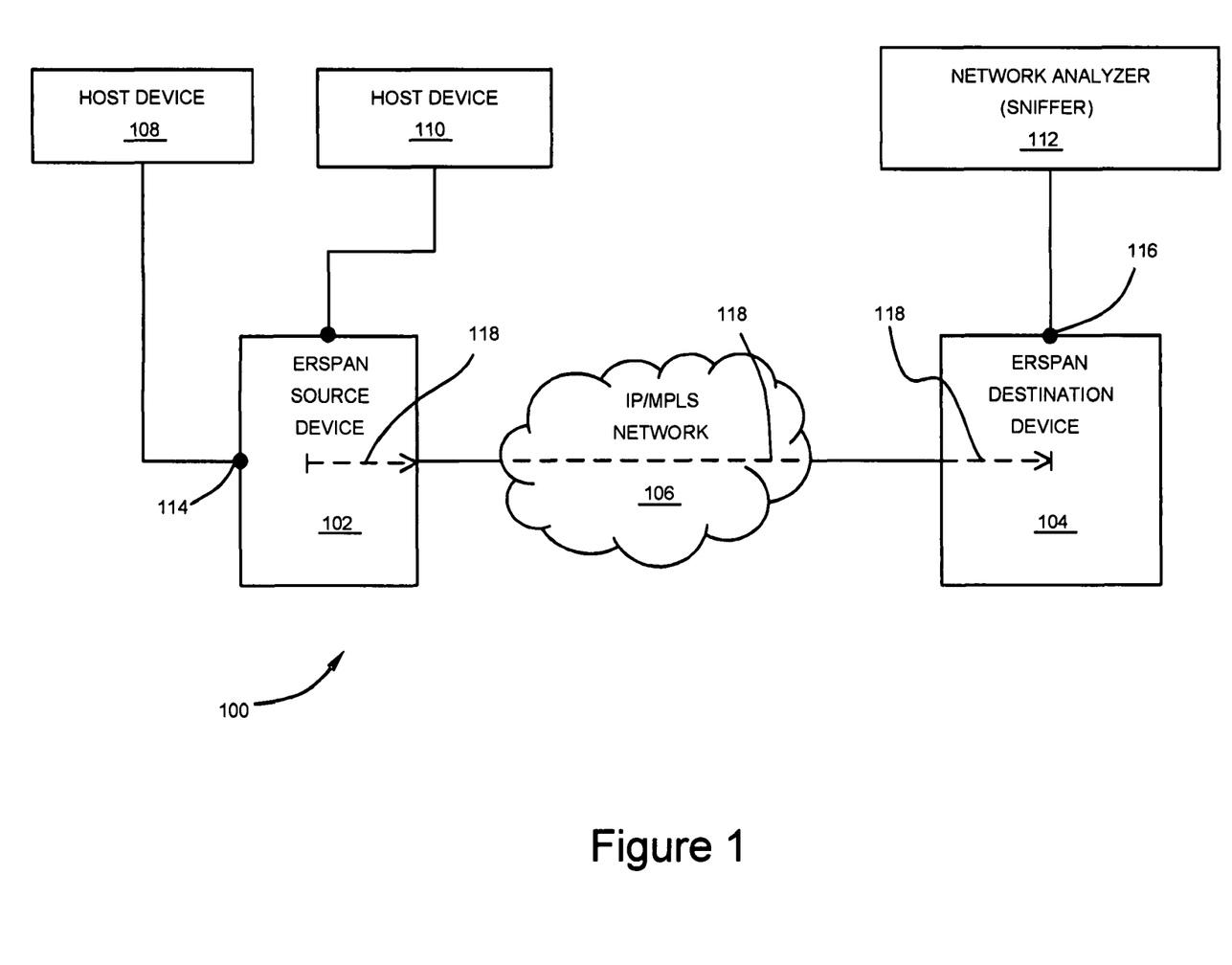
FIG. 1 is a block diagram illustrating an example of a system for an ERSPAN session.

FIG. 1 is a block diagram illustrating an example of a system 100 that supports an ERSPAN session. The system 100 includes an ERSPAN source device 102, herein referred to as source device 102, and an ERSPAN destination device 104, herein referred to as destination device 104, communicably coupled through an Internet Protocol (IP)/Multi Protocol Label Switching (MPLS) network 106. The source device 102 is coupled to a host device 108 and a host device 110; the source device 102 is coupled to the host device 108 at a source port 114. The host devices 108 and 110 are similar devices, such as client computers and the like, that communicate via the source device 102. The host devices 108 and 110 may be directly connected to the source device 102; alternatively, the host device 108 and/or the host device 110 may be coupled to the source device 102 via a network such as a Local Area Network (LAN), Wide Area Network (WAN), and the like. Such a network may include additional elements not shown, such as routers, hubs, switches, and the like.

The destination device 104 is coupled to a network analyzer 112 at a destination port 116. The network analyzer 112 may be a hardware device that receives a copy of the monitored traffic for analysis, such as any one of a number of commercially available "sniffers" for analyzing IP traffic. The network analyzer 112 may be directly connected to the destination device 104; alternatively, the network analyzer 112 may be coupled to the destination device 104 via a network such as a Local Area Network (LAN), Wide Area Network (WAN), and the like. Such a network acts as a "dumb link extender" and may include additional elements not shown, such as Dense Wavelength Division Multiplexing (DWDM) Layer 1 network elements, media converters, hubs, and the like.

The IP/MPLS network 106 comprises a communication system that connects a computer system by wire, cable, fiber optic and/or wireless link facilitated by various types of well-known network elements, such as hubs, switches, routers, and the like. The IP/MPLS network 106 may employ various well-known protocols to communicate information amongst the network resources. For example, the IP/MPLS network 106 may be a part of the internet or intranet using various communications infrastructure such as Ethernet, WiFi, WiMax, General Packet Radio Service (GPRS), and the like.

The source and destination devices 102 and 104 are L3 network devices, such as Catalyst switches manufactured by Cisco Systems, Inc., of San Jose, Calif., that support the ERSPAN functionality. The source and destination devices 102 and 104 may have different hardware and/or software platforms, and may support the same and/or different versions of the ERSPAN feature. For example, the source and destination devices 102 and 104 may support ERSPAN-Type II and/or ERSPAN-Type III functionality. Additionally, the source and destination devices 102 and 104 are configured to support a User Datagram Protocol (UDP) based protocol, known as EDySN, to dynamically configure, establish, and maintain one or more ERSPAN sessions between the source and destination devices 102 and 104 as further described below in relation to FIGS. 3 and 4.

The EDySN protocol is utilized to communicate between the source and destination devices 102 and 104 to configure, establish, and monitor the connectivity of a unidirectional L3 Generic Routing Encapsulation (GRE) tunnel 118 from the source device 102 to the destination device 104 for an ERSPAN session. During an ERSPAN session, the source device 102 mirrors the desired traffic to be monitored at the source device 102; for example, traffic at port 114 sent from host device 108 to host device 110 may be mirrored for remote monitoring. The mirrored traffic is encapsulated within the L3 routable GRE tunnel from the source device 102 to the destination device 104. At the destination device 104, the received ERSPAN traffic may be decapsulated and the recovered mirrored traffic sent to the destination port 116; alternatively, the received ERSPAN traffic may be sent to the destination port 116 without decapsulation. Alternatively and/or additionally, one or more ERSPAN sessions may be automatically configured, established, and maintained between the source and destination devices 102 and 104.

Figure 2:
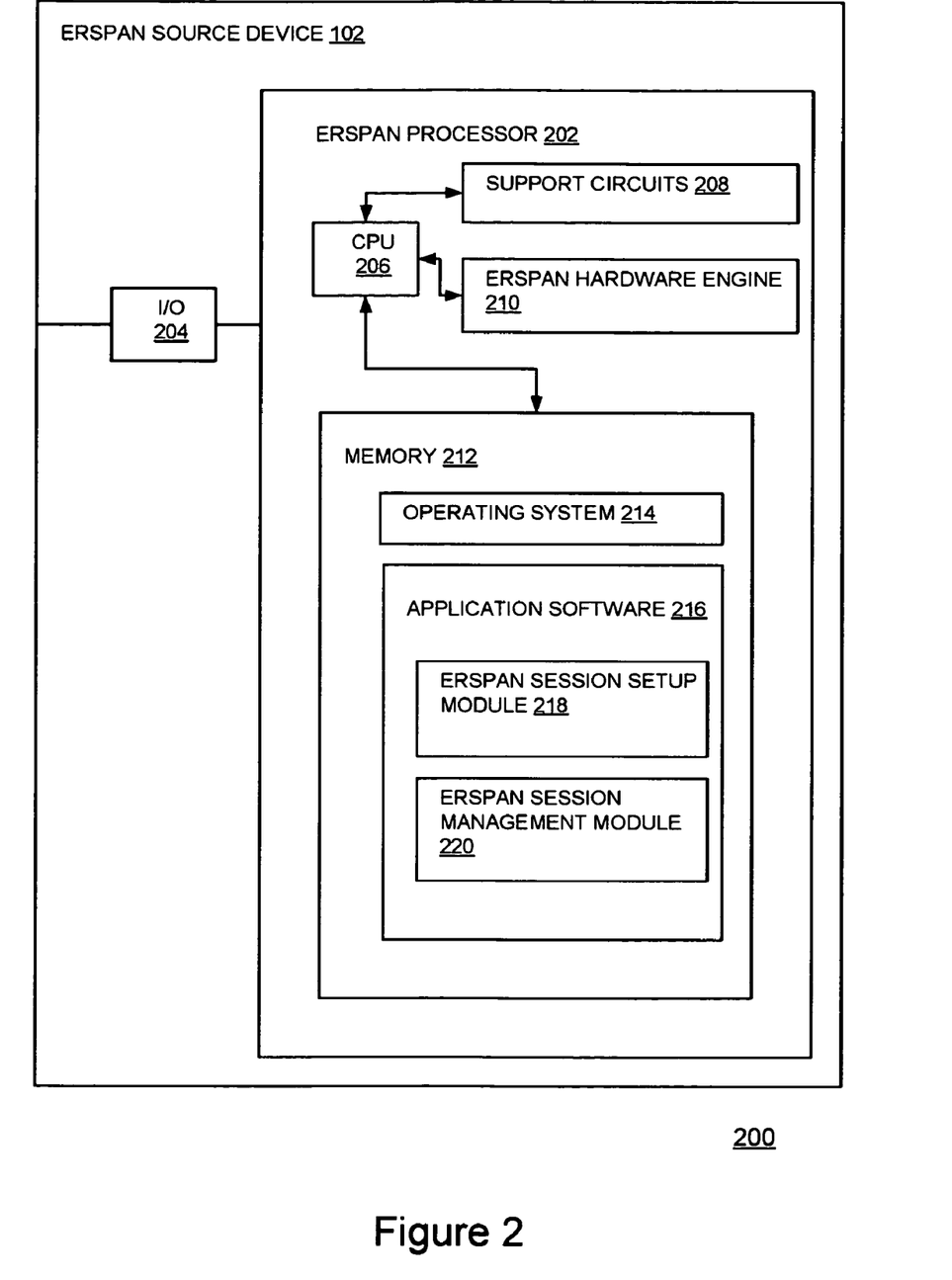
FIG. 2 is a block diagram illustrating an example of an ERSPAN source device.

FIG. 2 is a block diagram illustrating an example of an ERSPAN source device 102. The source device 102 includes an ERSPAN processor 202 and an input/output device 204 for communicating data ingress and egress to the source device 102 through a plurality of ports on the source device 102. The ERSPAN processor 202 includes a central processing unit (CPU) 206, various support circuits 208, a memory 212 and an ERSPAN hardware engine 210. Additionally, such an ERSPAN processor 202 is included in the ERSPAN destination device 104.

The CPU 206 may comprise one or more commercially available microprocessors or microcontrollers that facilitate data processing and storage. The support circuits 208 facilitate the operation of the CPU 206 and comprise at least one of dock circuits, power supplies, cache, input/output circuits, and the like. The memory 212 comprises at least one of read only memory (ROM), random access memory (RAM), disk drive storage, optical storage, removable storage, and the like.

The memory 212 includes an operating system 214 and application software 216. The operating system 214 is any commercially available operating system (e.g., the Internetwork Operating System (IOS) by Cisco Systems, Inc. the WINDOWS operating system by MICROSOFT, UNIX operating system, LINUX operating system, MACINTOSH operating system, and the like). The application software 216 includes an ERSPAN session setup module 218 and an ERSPAN session management module 220.

The ERSPAN hardware engine 210 enables the ERSPAN functionality of an ERSPAN device. In the source device 102, the ERSPAN hardware engine 210 copies the packets of the target traffic to be monitored, encapsulates the copied packets, and forwards the resulting ERSPAN frames to the destination device 104. In the destination device 104, the ERSPAN hardware engine 210 decapsulates the ERSPAN frames and forwards the retrieved copied traffic to the destination port 116. Alternatively, if the ERSPAN frames do not require decapsulation at the destination device 104, the destination device 104 ERSPAN hardware engine 210 forwards the complete ERSPAN frames to the destination port 116.

Figure 4A:
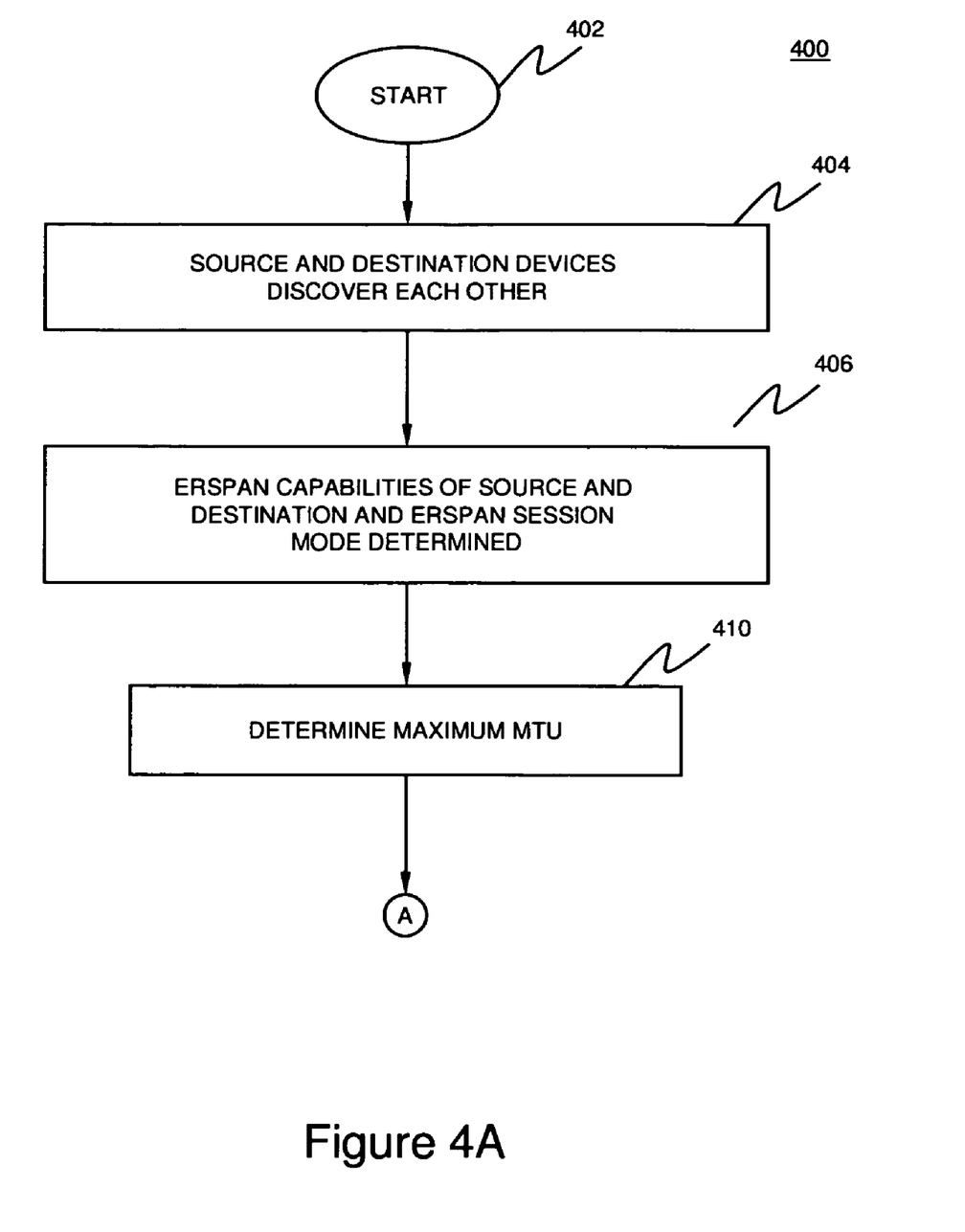
FIGS. 4A and 4B are flow diagrams illustrating an example of a method for auto-negotiating relevant ERSPAN session parameters.
Figure 4B:
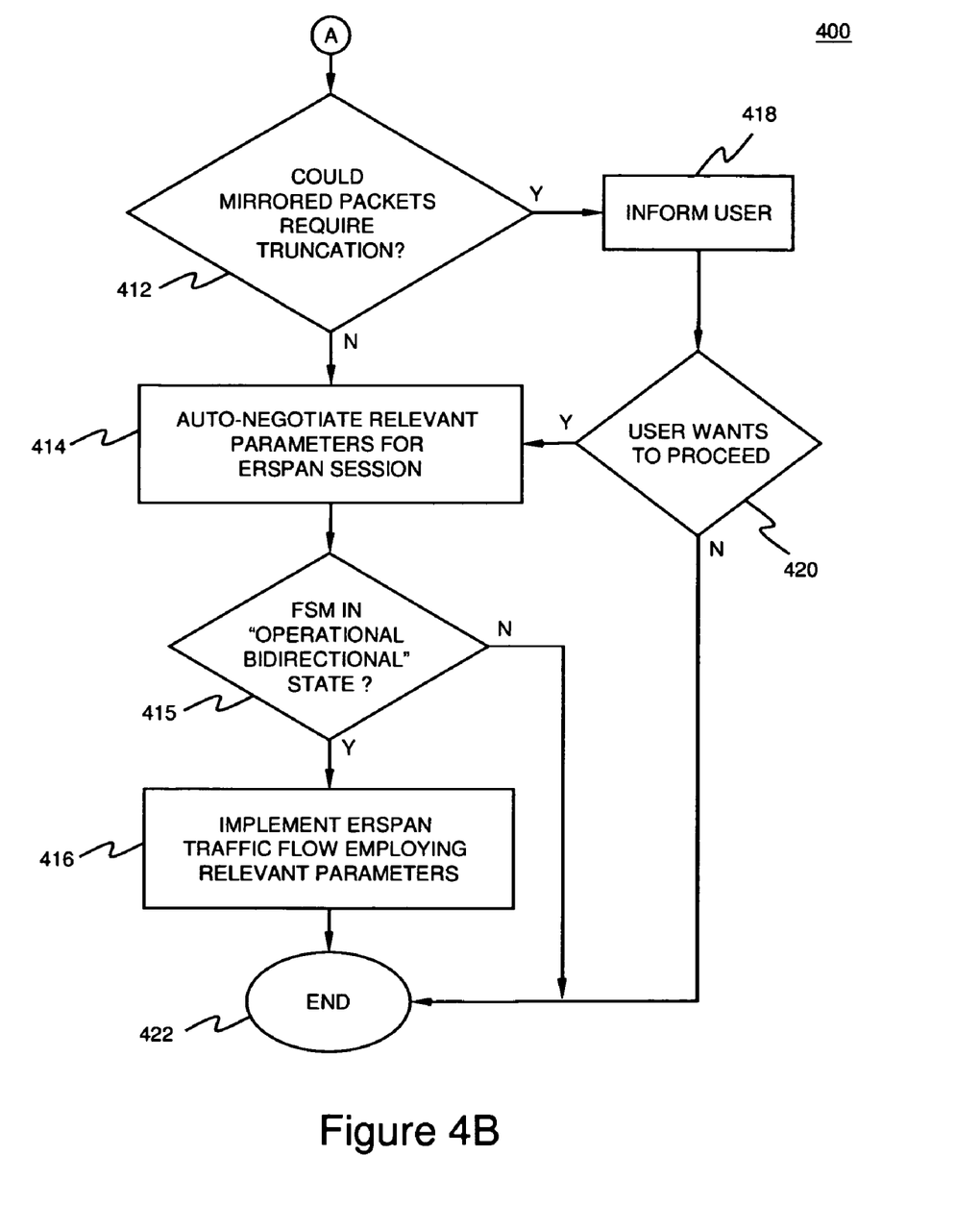

The ERSPAN session setup module 218 utilizes the EDySN protocol to automatically configure and establish one or more ERSPAN sessions between the source and destination devices 102 and 104. For example, the ERSPAN session setup module 218 may automatically configure and establish an ERSPAN session between the source and destination devices 102 and 104 such that the desired traffic at the source port 114 can be monitored via the destination port 116. In creating such an ERSPAN session, the ERSPAN session setup module 218 verifies the hardware and software platforms, the ERSPAN versions and capabilities of the source and destination devices 102 and 104. Additionally, the ERSPAN session setup module 218 negotiates relevant parameters for the ERSPAN session, and establishes the ERSPAN session as further described below in relation to FIG. 4. As such, the source and destination devices are simultaneously configured to avoid configuration mismatches.

The ERSPAN session management module 220 utilizes the EDySN protocol to automatically verify IP connectivity between the source and destination devices 102 and 104, and further to verify functionality of and successful communication between the ERSPAN hardware engines 210 of the source and destination devices 102 and 104. Additionally, the ERSPAN session management module 220 monitors the health of the ERSPAN session connectivity as further described below in relation to FIG. 3. Further, the ERSPAN session management module 220 may monitor the heath of one or more ERSPAN sessions between the source and destination devices 102 and 104.

Figure 3A:
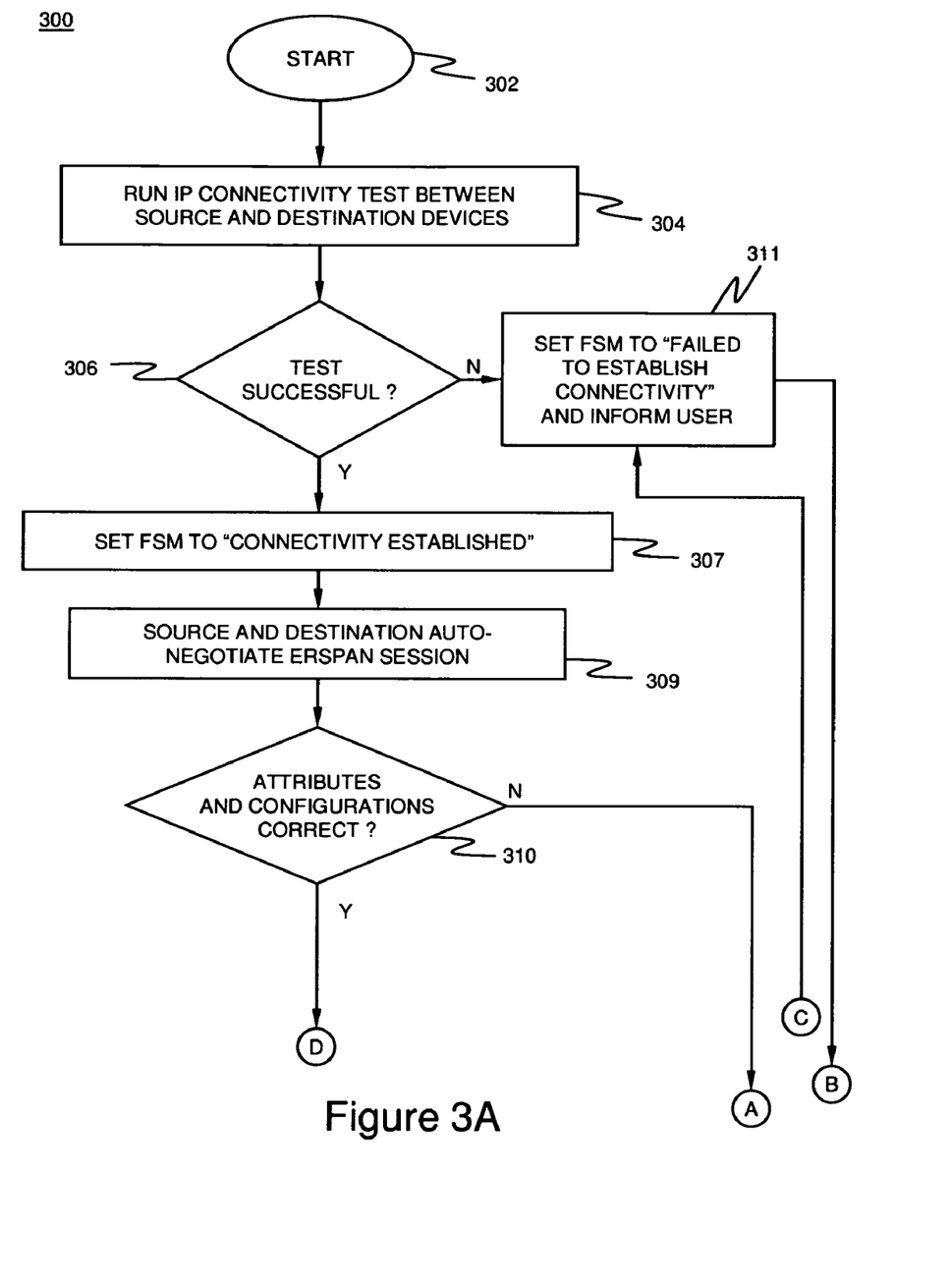
FIGS. 3A, 3B, and 3C are flow diagrams illustrating an example of a method for verifying connectivity between an ERSPAN source device and an ERSPAN destination device.
Figure 3B:
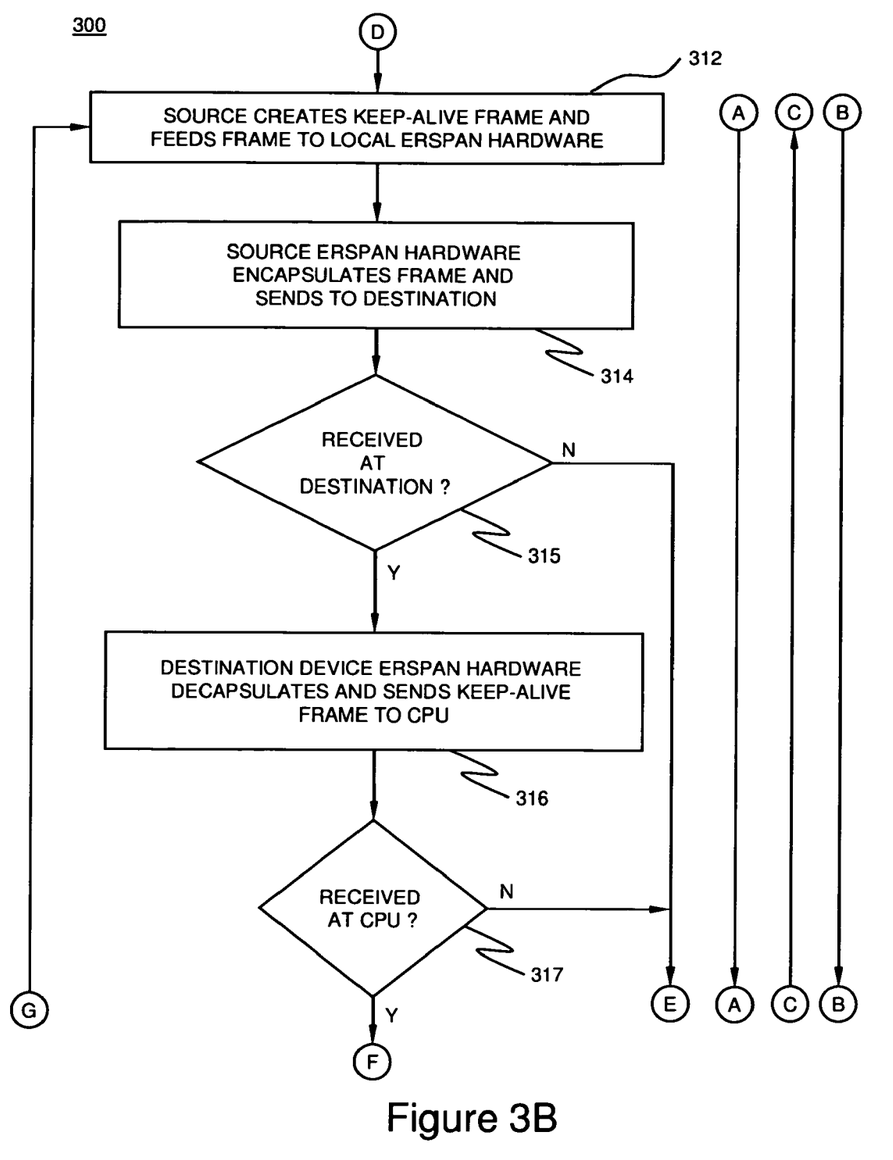
Figure 3C:
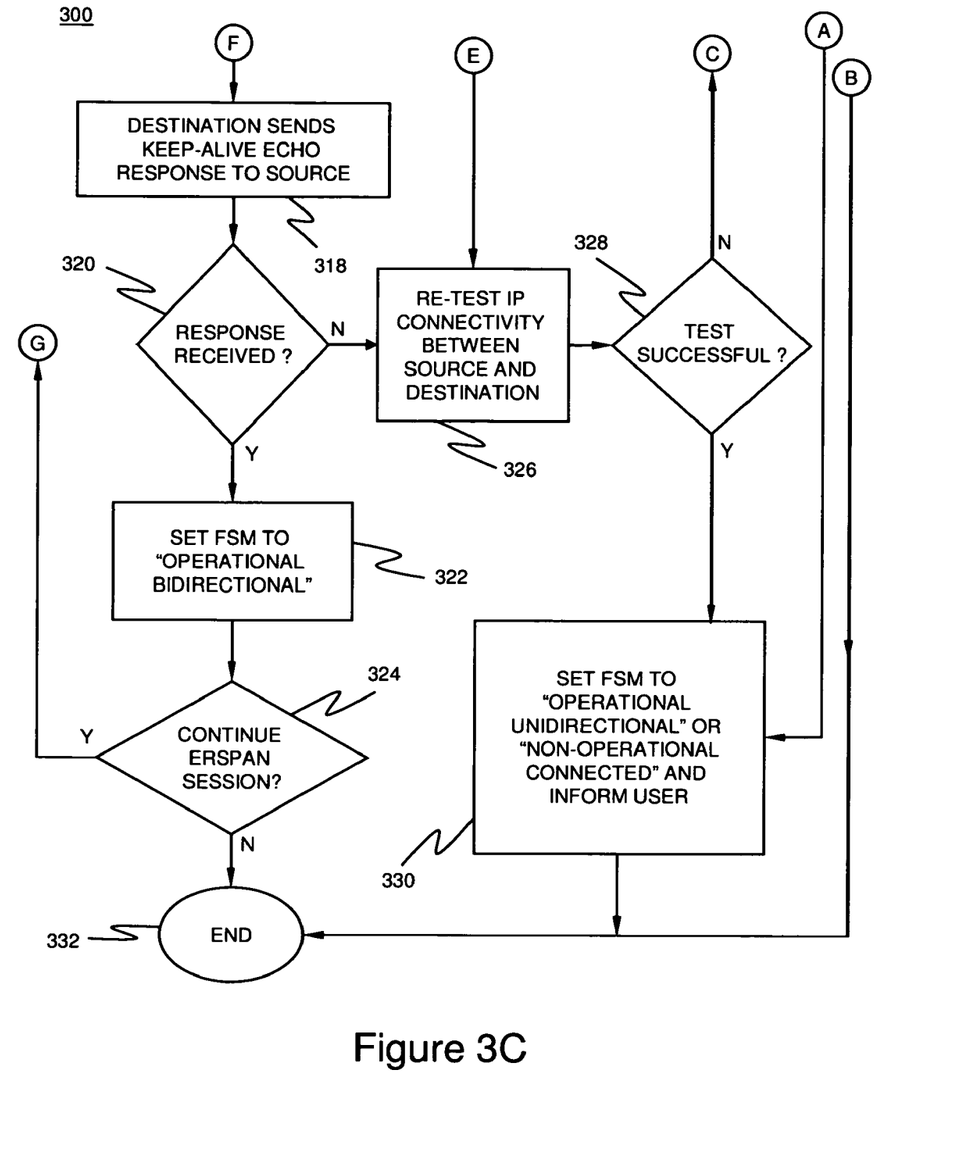

FIGS. 3A, 3B, and 3C are flow diagrams illustrating an example of a method 300 for verifying IP connectivity between an ERSPAN source device and an ERSPAN destination device. For convenience, the method 300 is described herein with respect to the architecture shown in FIG. 1. The method 300 employs the EDySN protocol to provide a two-stage asymmetrical connectivity check algorithm, utilizing UDP echo packets and special ERSPAN encapsulated L2 keep-alive frames, to confirm connectivity between the source and destination device ERSPAN control planes and ERSPAN hardware engines.

The method 300 begins at step 302 and proceeds to step 304. At step 304, the method 300 runs an IP connectivity test between the source and a destination devices 102 and 104 through the IP layer as a first stage of connectivity verification. The IP connectivity test follows a standard "ping" connectivity check behavior, utilizing EDySN UDP-based messages between the control planes of the source and destination devices to verify the IP connectivity. Additionally and/or alternatively, an Internet Control Message Protocol (ICMP) based ping connectivity approach may be utilized.

At step 306, a determination is made as to whether the IP connectivity test is successful. If it is determined that the IP connectivity test has failed (option "NO"), then the method 300 proceeds to step 311. At step 311, the method 300 sets a Finite State Machine (FSM) to a state "Failed to Establish Connectivity" and informs a user that the IP connectivity between the source and destination devices 102 and 104 could not be established. The method 300 then proceeds to step 332, where the method 300 ends.

If, at step 306, that the method 300 determines the IP connectivity test is successful (option "YES"), then the method 300 proceeds to step 307. At step 307, the method 300 sets the FSM to a state "Connectivity Established". The method 300 then proceeds to step 309. At step 309, the source and destination devices 102 and 104 auto-negotiate the relevant parameters for the ERSPAN session as further described below in relation to FIG. 4. At step 310, a determination is made as to whether the ERSPAN attributes and configurations of the source and destination devices 102 and 104 are correct. If the attributes and configurations are not correct (option "NO"), the method 300 proceeds to step 330. If the attributes and configurations are correct (option "YES"), the method 300 proceeds to step 312.

At step 312, the method 300 begins a second stage of connectivity verification, based on specially crafted ERSPAN keep-alive frames, to verify functionality of and successful communication between the ERSPAN hardware engines 210 of the source and destination devices 102 and 104. The source device 102 creates a keep-alive frame and routes the keep-alive frame to its ERSPAN hardware engine 210. The keep-alive frame includes an ERSPAN packet with a value in the frame header identifying it as a keep-alive frame. At step 314, the ERSPAN hardware engine 210 of the source device 102 encapsulates the keep-alive frame and forwards it to the destination device 104. At step 315, a determination is made as to whether the destination device 104 receives the encapsulated keep-alive frame. If the destination device 104 does not receive the encapsulated keep-alive frame (option "NO"), the method 300 proceeds to step 326; if the destination device does receive the encapsulated keep-alive frame (option "YES"), the method 300 proceeds to step 316. At step 316, the ERSPAN hardware of the destination device decapsulates the encapsulated keep-alive frame and sends the keep-alive frame to the CPU 206. At step 317, a determination is made as to whether the CPU 206 successfully receives and recognizes the keep-alive frame. If the CPU 206 does not receive and recognize the keep-alive frame (option "NO"), the method 300 proceeds to step 326. If the CPU 206 does receive and recognize the keep-alive frame (option "YES"), the method 300 proceeds to step 318.

At step 318, the destination device 104 communicates a User Datagram Protocol (UDP) keep-alive echo response to the source device 102 in response to the received keep-alive frame. At step 320, a determination is made as to whether the keep-alive echo response is received by the source device 102. If it is determined that the keep-alive echo response is received by the source device 102 (option "YES"), then the method 300 proceeds to step 322. At step 322, the method 300 sets the FSM to a state "Operational Bidirectional". The ERSPAN monitoring will only be enabled when the FSM is in the operational bidirectional state.

At step 324, a determination is made as to whether the ERSPAN session is to be continued. If it is determined that the ERSPAN session is to be continued (option "YES"), then the method 300 returns to step 312. If, at step 324, it is determined that the ERSPAN session is not to be continued (option "NO") then the method 300 proceeds to step 332 where the method 300 ends.

If, at step 320, it is determined that the keep-alive echo response is not received by the source device 102 (option "NO"), then the method 300 proceeds to step 326. At step 326, the method 300 re-tests the IP connectivity between the source and destination devices 102 and 104. At step 328, a determination is made as to whether the re-test is successful. If the re-test is not successful (option "NO"), the method 300 proceeds to step 311.

If, at step 328, it is determined that the re-test is successful (option "YES"), then the method 300 proceeds to step 330. At step 330, the method 300 sets the FSM to a state "Operational Unidirectional" or "Nonoperational Connected" and informs the user. The method 300 then proceeds to step 332. At step 332, the method 300 ends.

FIGS. 4A and 4B are flow diagrams illustrating an example of a method 400 for auto-negotiating relevant ERSPAN session parameters. For convenience, the method 400 is described herein with respect to the architecture shown in FIG. 1. The method 400 employs the EDySN protocol to dynamically configure, establish, and maintain the ERSPAN session between the source devices 102 and 104. Additionally, the method 400 may configure, establish, and maintain more than one ERSPAN session between the source and destination devices 102 and 104.

The method 400 begins at step 402 and proceeds to step 404, at which point the source and destination devices 102 and 104 discover each other and the device identities are mutually verified. During message exchange between the source and destination devices 102 and 104, such as the message exchange during the mutual discovery phase of step 402, authentication is performed when enabled by a user. Such authentication is performed through the use of crypto checksums within the EDySN protocol messages exchanged between the source and destination devices 102 and 104. For example, a Secure Hash Algorithm (SHA), such as SHA-2, may be utilized to compute the checksums. At step 406, the platforms and capabilities of the source and destination devices 102 and 104 are discovered. Hardware and software platforms and capabilities, including common ERSPAN versions, of the source and destination devices 102 and 104 are identified in order to determine the required ERSPAN mode for the ERSPAN session. For example, device ERSPAN capabilities may include ERSPAN Type II only, ERSPAN Type II and Type III only, and ERSPAN Type II and Type III with forward compatibility mode. The required ERSPAN termination mode is determined and established based on common device capabilities and the requirements of the network analyzer 112 connected to the destination device 104. For example, termination mode options may include ERSPAN Type II with descapsulation, ERSPAN Type II with relay, ERSPAN Type III with descapsulation, and ERSPAN Type III with relay. For ERSPAN Type II and Type III with relay, the ERSPAN header is preserved in order to relay additional information; therefore, decapsulation of the ERSPAN frames is not required at the destination device.

At step 410, a Maximum Transfer Unit (MTU) along the "path" between the source and destination devices 102 and 104 is determined. For example, EDySN may employ a standard technique such as path MTU discovery to determine smallest MTU of any of the possible paths between the source and destination devices, thus defining the largest packet size that can be transmitted between the source and destination without suffering any fragmentation.

At step 412, a determination is made as to whether the ERSPAN encapsulated mirrored traffic packets may be truncated based on the largest MTU that can be transmitted between the source and destination devices 102 and 104. If it is determined that the ERSPAN encapsulated mirrored traffic packets may be truncated (option "YES"), then the method 400 proceeds to step 418 and informs a user that the mirrored traffic packets may be truncated. At step 420, a determination is made as to whether the user wants to proceed. If it is determined that the user wants to proceed (option "YES"), then the method 400 proceeds to step 414. If, at step 420, it is determined that the user does not want to proceed (option "NO"), then the method 400 proceeds to step 422, where the method 400 ends.

If, at step 412, it is determined that the ERSPAN encapsulated mirrored traffic packets would not be truncated (option "NO"), then the method 400 proceeds to step 414. At step 414, the method 400 negotiates relevant parameters for the ERSPAN session, including parameters for both IP transport and ERSPAN frame header information. During the auto-negotiation, a unique ERSPAN session ID is automatically established for the ERSPAN session. This session ID uniquely identifies a flow of mirrored traffic from the source device 102 to the destination device 104. Time To Live (TTL) values are determined to enforce security constraints based on the topology of the network 106 through which the source and destination devices 102 and 104 are transmitting. For an ERSPAN Type III platform, the timestamp granularity is determined based on the capabilities of the source device 102 and the requirements of the network analyzer 112. Additionally, keep-alive sessions between the source and destination devices 102 and 104, as described above in relation to FIG. 3, are automatically established. Additional ERSPAN parameters may be auto-negotiated between the source and destination devices 102 and 104 based on the network 106 topology and ERSPAN mode for the ERSPAN session. At step 415, a determination is made as to whether the FSM is in an "Operational Bidirectional" state, as described above in relation to FIG. 3. If the FSM is not in an "Operational Bidirectional" state (option "NO"), the method 400 proceeds to step 422 and ends. If, at step 415, it is determined that the FSM is in an "Operational Bidirectional" state (option "YES"), the method 400 proceeds to step 416. At step 416, the method 400 implements the ERSPAN traffic flow as per the auto-negotiated parameters described above. The method 400 then proceeds to step 422, where it ends.

Additionally, EDySN may carry other types of important information in its messages in addition to the identity, status, and parameter information described above, such as system and event information when applicable. For example, an ERSPAN configuration change message on the source device 102 may be relayed to the destination device 104 for the user to see on both devices. Further, any other "remote" information (e.g., any remote event notification) that is useful to have also on the peer device can be transported to it via EDySN messages when applicable.

Variations of the method and apparatus described above are possible without departing from the scope of the invention. In view of the wide variety of embodiments that can be applied, it should be understood that the illustrated embodiments are exemplary only, and should not be taken as limiting the scope of the following claims.

What is claimed is:

1. A method comprising:
 discovering a Layer 3 (L3) source device and an L3 destination device, wherein the L3 source device passes target traffic to the L3 destination device that is monitored via the L3 destination device in a remote traffic monitoring session;
 identifying configurations of the L3 source device and the L3 destination device to be used for establishing the remote traffic monitoring session between the L3 source device and the L3 destination device;
 determining common remote monitoring capabilities of the L3 source device and the L3 destination device;
 negotiating at least one parameter for the remote traffic monitoring session to create a unique identifier for the session to uniquely identify a flow of the target traffic from the L3 source device to the L3 destination device; and
 establishing the remote traffic monitoring session using information pertaining to the configurations, the common remote monitoring capabilities, and the at least one parameter.

2. The method of claim 1, wherein establishing the remote traffic monitoring session comprises establishing the remote traffic monitoring session with Encapsulated Remote Switched Port Analyzer (ERSPAN) capabilities.

3. The method of claim 2, wherein establishing the remote traffic monitoring session with ERSPAN capabilities comprises establishing the remote traffic monitoring session with at least one of ERSPAN Type-II capabilities and ERSPAN Type-III capabilities.

4. The method of claim 1, further comprising utilizing a unidirectional or bidirectional L3 Generic Routing Encapsulation tunnel from the L3 source device to the L3 destination device to establish the remote traffic monitoring session.

5. The method of claim 1, wherein the at least one parameter includes at least one of a Maximum Transmission Unit (MTU), a Time to Live (TTL), and a timestamp granularity.

6. The method of claim 1, further comprising initiating and maintaining a keep-alive session automatically between the L3 source device and the L3 destination device.

7. The method of claim 1, wherein negotiating comprises automatically negotiating at least one parameter for the remote traffic monitoring session.

8. The method of claim 1, further comprising:
 mirroring the target traffic to be passed by the L3 source device to the L3 destination device to remotely monitor the target traffic at the L3 source device and to encapsulate the target traffic within an L3 routable Generic Routing Encapsulation (GRE) tunnel between the L3 source device and the L3 destination device;
 verifying Internet Protocol (IP) connectivity between the L3 source device and the L3 destination device; and
 determining whether packets of the encapsulated target traffic should be truncated based on a maximum transfer unit (MTU) value of packets that can be transmitted between the L3 source device and the L3 destination device.

9. A method comprising:
 generating at least one keep-alive frame at a Layer 3 (L3) source device to be sent to an L3 destination device to verify communications between the L3 source device and the L3 destination device;
 encapsulating the at least one keep-alive frame at a first remote monitoring hardware unit of the L3 source device;
 sending the at least one encapsulated keep-alive frame to the L3 destination device;
 decapsulating, at a second remote monitoring hardware unit of the L3 destination device, the at least one encapsulated keep-alive frame;

processing the at least one encapsulated keep-alive frame at the L3 destination drive;

transmitting, in response to successfully receiving, decapsulating, and processing the at least one encapsulated keep-alive frame at the L3 destination device, at least one response message from the L3 destination device to the L3 source device;

at the L3 destination device, communicating a keep-alive echo response to the L3 source device;

at the L3 source device, determining whether the keep-alive echo response is received by the L3 source device; and at the L3 source device, operating the L3 source device and L3 destination device in an operational bidirectional state if the keep-alive echo response is received by the L3 source device.

10. The method of claim 9, further comprising performing at least one Internet Protocol (IP) connectivity test between the L3 source device and the L3 destination device.

11. The method of claim 9, wherein encapsulating comprises encapsulating the at least one keep-alive frame at an Encapsulated Remote Switched Port Analyzer (ERSPAN) hardware unit of the L3 source device that has at least one of ERSPAN Type-II capabilities and ERSPAN Type-III capabilities and wherein decapsulating comprises decapsulating the keep-alive frame at an ERSPAN hardware unit of the L3 destination device that has at least one of ERSPAN Type-II capabilities and ERSPAN Type-III capabilities.

12. The method of claim 9, wherein transmitting comprises transmitting the at least one response message that utilizes a User Datagram Protocol.

13. An apparatus comprising:
a hardware unit configured to perform network session operations;
an input/output device configured to communicate data ingress to and egress from the apparatus;
a processor configured to:
discover a Layer 3 (L3) source device and an L3 destination device;
identify configurations of the L3 source device and the L3 destination device to be used for establishing a remote traffic monitoring session between the L3 source device and the L3 destination device;
determine common remote monitoring capabilities of the L3 source device and the L3 destination device;
negotiate at least one parameter for the remote traffic monitoring session to create a unique identifier for the session to uniquely identify a flow of target traffic from the L3 source device to the L3 destination device; and
establish the remote traffic monitoring session using information pertaining to the configurations, the common remote monitoring capabilities, and the at least one parameter.

14. The apparatus of claim 13, wherein the processor is further configured to initiate and maintain a keep-alive session automatically between the L3 source device and the L3 destination device.

15. The apparatus of claim 14, wherein the processor is further configured to initiate and maintain the keep-alive session utilizing User Datagram Protocol messages.

16. The apparatus of claim 14, wherein the processor is further configured to initiate and maintain the keep-alive session that comprises at least one Internet Protocol (IP) connectivity test between the L3 source device and the L3 destination device.

17. The apparatus of claim 13, wherein the hardware unit is an Encapsulated Remote Switched Port Analyzer (ERSPAN) hardware unit that supports at least one of ERSPAN Type-II capabilities and ERSPAN Type-III capabilities.

18. The apparatus of claim 13, wherein the processor is further configured to automatically negotiate at least one parameter for the remote traffic monitoring session.

19. The apparatus of claim 18, wherein the processor is further configured to automatically determine common remote monitoring capabilities of the L3 source device and the L3 destination device.

20. The apparatus of claim 19, wherein the processor is further configured to use the at least one parameter that includes at least one of a Maximum Transmission Unit (MTU), a Time to Live (TTL), and a timestamp granularity.

21. The apparatus of claim 13, wherein the processor is further configured to
mirror target traffic to be passed by the L3 source device to the L3 destination device to remotely monitor the target traffic at the L3 source device and to encapsulate the target traffic within an L3 routable Generic Routing Encapsulation (GRE) tunnel between the L3 source device and the L3 destination device;
verify Internet Protocol (IP) connectivity between the L3 source device and the L3 destination device; and
determine whether packets of the encapsulated target traffic should be truncated based on a maximum transfer unit (MTU) value of packets that can be transmitted between the L3 source device and the L3 destination device.

22. The apparatus of claim 13, wherein the processor is further configured to utilize a unidirectional or bidirectional L3 Generic Routing Encapsulation tunnel from the L3 source device to the L3 destination device to establish the remote traffic monitoring session.

* * * * *